Patented Jan. 12, 1926.

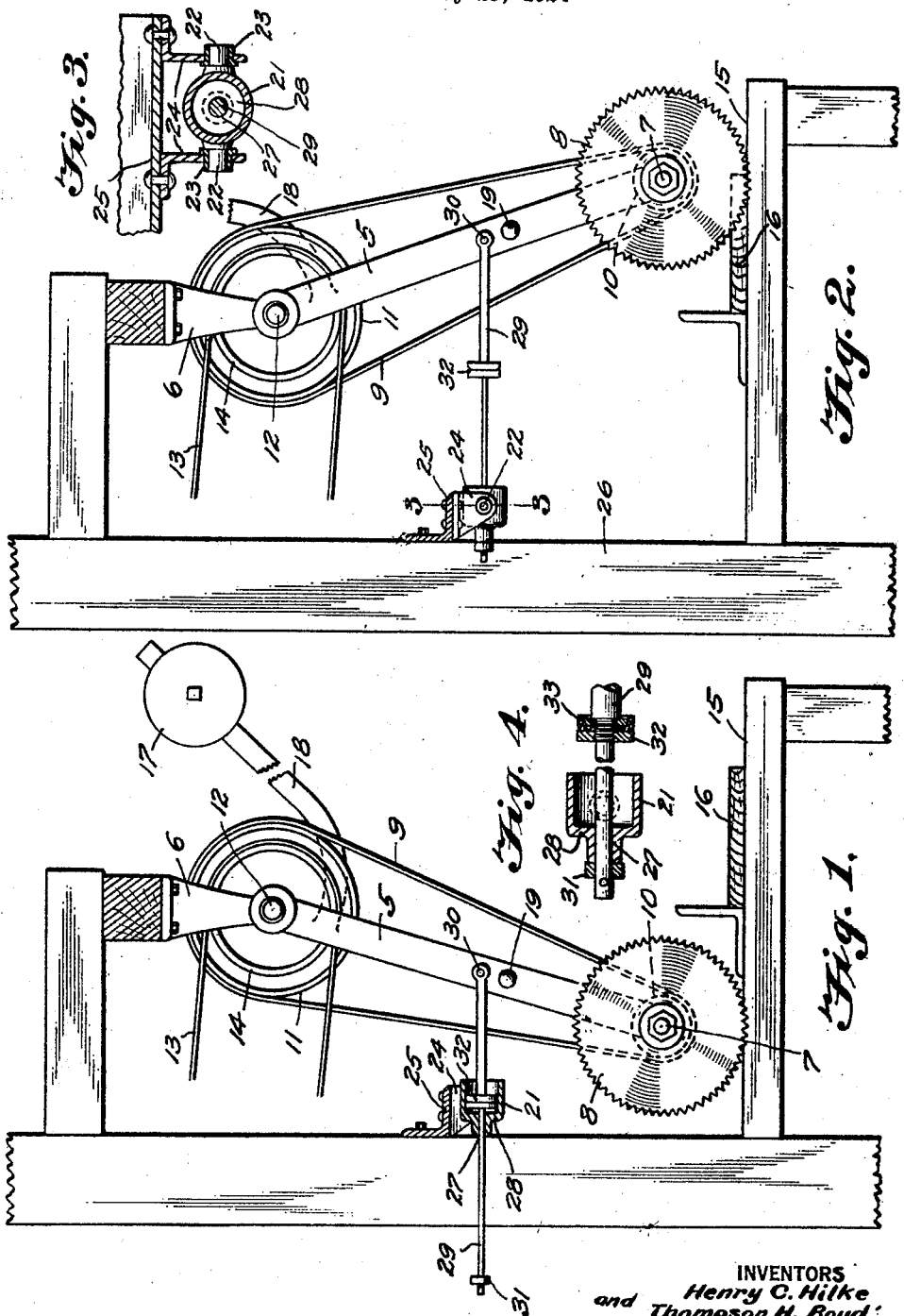

1,569,186

UNITED STATES PATENT OFFICE.

HENRY C. HILKE AND THOMPSON H. BOYD, OF SEATTLE, WASHINGTON.

AUTOMATIC CHECK FOR TRIMMER SAWS.

Application filed May 29, 1924. Serial No. 716,558.

*To all whom it may concern:*

Be it known that we, HENRY C. HILKE and THOMPSON H. BOYD, citizens of the United States, residing at Seattle, in the county of King and State of Washington, have invented certain new and useful Improvements in Automatic Checks for Trimmer Saws, of which the following is a specification.

This invention relates to automatic check for trimmer or swing cut-off saws; and the object of the invention, generally, is to provide check devices for use with the swinging frame of trimmer saws for eliminating the rebound or "kick-back" thereof which has oftentimes proved dangerous to the operator.

A further object is the provision of a device of this character which is of inexpensive and durable construction, readily applied, and efficient in operation.

More specific objects and advantages of the invention will appear in the following specification.

The invention consists in the novel construction, adaptation and combination of parts hereinafter described and claimed.

In the accompanying drawing,—

Figure 1 is a view in side elevation, partly in section, of a trimmer-saw with a check device embodying our invention applied thereto, the saw being represented in its inoperative position. Fig. 2 is a side elevation of the same with the saw in its forward position. Fig. 3 is a transverse section on line 3—3 of Fig. 2, and Fig. 4 is a detail longitudinal section taken through the cylinder and piston of the stop devices.

Referring to the drawing, the reference numeral 5 represents the frame of a trimmer-saw machine, said frame depends from and is pivotally connected to hangers such as 6. Journaled in the lower part of the frame 5 is the arbor 7 of a saw 8 which is driven by means of a belt 9 passing around pulleys 10 and 11 mounted upon said arbor and a driven shaft 12 which extends axially through the pivotal support of the frame 5. 13 represents a power transmission belt passing about a driven pulley 14 provided on the shaft 12.

15 represents a table for supporting the work such as 16, for example.

The saw is normally held in its Fig. 1 position as by means of a counter weight 17 as shown provided upon an arm 18 attached to the frame 5. The saw is brought forward manually into its Fig. 2 position to cause the saw to sever the work through the medium of a handle 19, or an equivalent provided on said frame. After the work is thus cut, the operator pushes against the handle 19 to swing the frame and its saw back from the work or, by releasing the handle, permits the counter weight 17 asserting its power to return the saw into its Fig. 1 position.

When the frame is swung back with rapidity as frequently occurs, the power of the counterweight is incapable of overcoming the inertia of the moving parts in their reverse swing or rebound, as it is termed. The saw is thus carried forwardly, oftentimes resulting in the fingers or hand of the operator being amputated, or making an incision in his abdomen.

Our invention is designed to obviate the dangers above referred to through the instrumentality of devices which automatically overcome any reacting or rebounding movement of the frame and the saw which is carried thereby.

According to the present invention, we provide a cylinder 21 of a length less than the travel of the piston 32, hereinafter described, which operates within the cylinder. Said cylinder having at diametrically opposite sides trunnions 22 (Figs. 2 and 3) which are mounted in bearings 23 of hangers 24 depending from a bracket 25, or an equivalent, located at the rear of the frame 5 and secured to a framework 26 of a mill structure.

Extending axially through said cylinder and a guide hole 27 provided in the cylinder end 28 is a rod 29 having one of its ends connected by a pivotal pin 30 to the frame 5. The other end of the rod 29 has rigidly mounted thereon a collar or nut 31 engageable with the cylinder end 28 to serve as a stop to limit the forward travel or "throw" of the frame 5 and of the saw 8 which is carried by said frame.

Secured upon the rod 29 is a piston 32 which, during the latter part of the rearward swing of the frame 5, is arranged to enter the cylinder whereupon the cylinder acts as a dash pot to cushion or overcome the rearward travel of the frame and also acts to obviate any tendency of the frame to rebound from its Fig. 1 position.

With the piston thus engaged, the power of the counterweight 17 is sufficient to prevent the frame and the saw accidentally swinging forward.

When the piston, however, is withdrawn from the cylinder, the frame 5 is unrestrained and is readily swung by the operator into and from cutting position.

For cutting operations, the saw carrying frame 5 must be swung into its work cutting position (Fig. 2) by extraneous power as by the operator pulling the frame 5 forward by means of the handle 19.

In practice the piston 32 may be formed, or provided with means such, for example, as by cup packing 33 (Fig. 4), to afford a substantially non-leakable fit in the cylinder 21.

The construction of our invention, the manner of applying the same, and its operation will, it is thought, be understood from the foregoing description.

In use it serves to prevent the accidental cutting of the operator by eliminating what is conventionally known as kick-back or rebound, thereby safeguarding mill workers from a danger hitherto of frequent occurrence.

What we claim as our invention, is—

1. The combination with the swingable frame of a trimmer-saw machine, of a cylinder having an end provided with a central aperture, a rod extending through said aperture and having one of its ends connected to said frame, means provided upon said rod adjacent its other end and engageable with said cylinder end to limit the travel of the frame in one direction, and a piston mounted upon the rod and adapted to enter the cylinder to limit the travel of the frame in the other direction.

2. In apparatus of the character described, a cylinder adapted to be connected for oscillatory motion to the framework of a mill structure, and a rod adapted to be pivotally connected at one of its ends to the frame of a swingable trimmer saw, and a piston secured to said rod and arranged to enter said cylinder to cooperate with the latter for checking the swing of the trimmer saw frame, said piston and the rod therefor being guided by the cylinder when the piston is separated from the cylinder.

3. In apparatus of the character described, the combination with the swingable frame of a trimmer-saw, of a cylinder, a rod extending axially through said cylinder and having one of its ends connected to said frame and its other end guided by the cylinder, a piston rigid with said rod adjacent to the connection of the latter with said frame, said piston being arranged to enter the cylinder and operate therein during the latter portion of the rearward swing of the frame and the early portion of the forward swing thereof to cause the cylinder to act as a dash pot to eliminate rebound motion of the frame, said piston and cylinder being inoperative to restrain the movements of the frame during the cutting operation of the saw which is carried thereby.

Signed at Seattle, Washington, this 16th day of May 1924.

HENRY C. HILKE.
THOMPSON H. BOYD.